(12) United States Patent
Rosenbaum et al.

(10) Patent No.: US 11,910,738 B2
(45) Date of Patent: Feb. 27, 2024

(54) SEED TRANSPORTATION SYSTEM AND METHOD

(71) Applicants: AIT Austrian Institute of Technology GmbH, Vienna (AT); INDAT Modellbau Werkzeugbau Formenbau GmbH, Rohrbach a.d. Gölsen (AT)

(72) Inventors: Wolfgang Rosenbaum, Rohrbach a.d. Gölsen (AT); Markus Leopold, Rohrbach a.d. Gölsen (AT); Nikolaus Pfaffenbichler, Vienna (AT); Birgit Mitter, Hinterbruhl (AT)

(73) Assignees: AIT AUSTRIAN INSTITUTE OF TECHNOLOGY GMBH, Vienna (AT); INDAT MODELLBAU WERKZEUGBAU FORMENBAU GMBH, Rohrbach A.D. Golsen (AT)

( * ) Notice: Subject to any disclaimer, the term of this patent is extended or adjusted under 35 U.S.C. 154(b) by 172 days.

(21) Appl. No.: 16/649,587

(22) PCT Filed: Sep. 21, 2018

(86) PCT No.: PCT/EP2018/075590
§ 371 (c)(1),
(2) Date: Mar. 20, 2020

(87) PCT Pub. No.: WO2019/057885
PCT Pub. Date: Mar. 28, 2019

(65) Prior Publication Data
US 2020/0275600 A1 Sep. 3, 2020

(30) Foreign Application Priority Data
Sep. 22, 2017 (EP) ..................................... 17192678

(51) Int. Cl.
*A01C 1/00* (2006.01)
*A01C 1/04* (2006.01)
*B65G 29/00* (2006.01)

(52) U.S. Cl.
CPC ................ *A01C 1/04* (2013.01); *B65G 29/00* (2013.01); *A01C 2001/048* (2013.01)

(58) Field of Classification Search
CPC ........ A01C 1/00; A01C 1/04; A01C 2001/048
(Continued)

(56) References Cited

U.S. PATENT DOCUMENTS 4,023,511 A * 5/1977 Newman ................ A01C 5/045
111/91
7,093,548 B2 * 8/2006 Eben ...................... A01C 7/046
111/185

(Continued)

FOREIGN PATENT DOCUMENTS

CN 2493039 Y 5/2002
CN 201451270 U 5/2010
(Continued)

OTHER PUBLICATIONS

First Office Action received in Chinese Application No. 201880061225. 4, dated May 6, 2021 (English Translation Provided).
(Continued)

*Primary Examiner* — David J Parsley
(74) *Attorney, Agent, or Firm* — Greer, Burns & Crain, Ltd

(57) ABSTRACT

A seed transportation system and method for using the same, the seed transportation system including a rotatable wheel with at least one seed supports for holding a seed, wherein the at least one seed support has one or more fixed support structures configured to restrict movement of the seed in a circumferential direction relative to the rotatable wheel and
(Continued)

in a direction away from an axis of rotation of the rotatable wheel, and wherein the at least one seed support has an access opening in its radially outer side, the access opening permitting access to the seed for creating an opening in the seed.

13 Claims, 2 Drawing Sheets

(58) Field of Classification Search
USPC .................................. 47/1.01 R, 14, 57.6
See application file for complete search history.

(56) References Cited

U.S. PATENT DOCUMENTS

| | | | |
|---|---|---|---|
| 7,451,713 | B2 | 11/2008 | Mariman et al. |
| 7,998,669 | B2 | 8/2011 | Deppermann et al. |
| 8,375,873 | B2* | 2/2013 | Nelson .................... A01C 7/046 |
| | | | 111/185 |
| 8,850,998 | B2* | 10/2014 | Garner ..................... A01C 7/16 |
| | | | 111/171 |
| 10,010,023 | B2 | 7/2018 | Natarajan |
| 11,039,566 | B2 | 6/2021 | Reichenberger et al. |
| 2007/0207485 | A1 | 9/2007 | Deppermann et al. |
| 2010/0224110 | A1* | 9/2010 | Mariman ................ A01C 7/046 |
| | | | 111/11 |
| 2015/0322443 | A1 | 11/2015 | McCarty, II et al. |

FOREIGN PATENT DOCUMENTS

| | | |
|---|---|---|
| CN | 205308430 U | 6/2016 |
| CN | 107156867 A | 9/2017 |
| WO | 2009/153646 A1 | 12/2009 |
| WO | 2009153646 | 12/2009 |

OTHER PUBLICATIONS

European Search Report for European Patent Application No. 17192678, dated Mar. 2, 2018.

International Search Report for International Patent Application No. PCT/EP2018/075590, dated Nov. 16, 2018.

* cited by examiner

SEED TRANSPORTATION SYSTEM AND METHOD

BACKGROUND

The present invention concerns a seed transportation system comprising a rotatable wheel with at least one seed support for holding a seed, and wherein said at least one seed support has one or more fixed support structures configured to restrict movement of the seed in a circumferential direction relative to the rotatable wheel and in a direction away from an axis of rotation of the rotatable wheel, wherein said at least one seed support has an access opening in its radially outer side, said access opening permitting access to the seed. In addition, the present invention concerns a method for transporting at least one seed with a seed transportation system comprising a rotatable wheel with at least one seed support for holding a seed, wherein said at least one seed support has one or more fixed support structures configured to restrict movement of the seed in a circumferential direction relative to the rotatable wheel and in a direction away from an axis of rotation of the rotatable wheel, wherein said at least one seed support has an access opening in its radially outer side, said access opening permitting access to the seed, the method comprising the steps of receiving a seed in the at least one seed support, and rotating the rotatable wheel, thereby conveying the seed.

Here the terms "seeds", "seed", "grains" or "grain" are used as a general reference to all kinds of propagative plant structures, which are suitable for industrial processing and distribution, including but not limited to commercially produced and distributed seed products, i.e. which meet common minimal requirements regarding quantity, distinctiveness, uniformity, stability and growability. In particular this includes dry ungerminated seeds, soaked seeds, germinated seeds, tubers and other types of crop-parts that can be used for plant propagation, as well as plant shoots.

There is an increasing need for methods and devices for automatically processing individual seeds, including opening and modifying the seeds. All such methods require transportation of the individual seeds. Consequently, various systems and methods have been proposed: US 2007/207485 A1 shows an automated seed sampler system for opening the coat of a seed and extracting a sample of seed material from the open seed. The sampler system includes a seed transport subsystem with a round motorized table. Several seed holders having opposing clamp heads for clamping an individual seed are arranged along the circumference of the table. The clamp heads are separated by a seed channel extending in a radial direction relative to the table. Before opening, the seed is aligned in an axial direction by forcing it with a plunger shaft against a plate arranged parallel to the table above the seed holder. Thereafter, a milling tool approaches the seed over a specific predetermined distance from an axial direction to remove a portion of the seed coat. Overall, this system requires several sequential steps for fixing and aligning each individual seed, before it can be accessed and opened.

Another seed sampling system is disclosed in WO 2012/012411 A2. This system proposes suction cups to hold individual seeds at the end portions of pistons arranged in banks. Each seed is held within one suction cup by supplying air pressure thereto. The alignment of the individual seeds with respect to a cutting wheel for opening each seed is achieved by actuating each piston towards ramp surfaces arranged adjacent the cutting wheel. Moreover, albeit only for the purpose of individualizing seeds, the system comprises separating wheels having apertures, each in communication with a vacuum source.

WO 2009/153646 A1 shows a disk for the dosage and individual selection of seeds. It discloses use of the disk in precision seeders, able to discharge one seed at a time in the desired positions. The seeds are not modified while received in the disk; in particular WO 2009/153646 A1 does not disclose creating an opening in a seed. Each seed is received in a housing seating that is connected with an individual aperture in a radially outer side of the disk to allow air to pass from the connected housing seating to the outside of the disk, said aperture having a semi-circular cross section.

It is an object of the present invention, to simplify the procedure of fixing and aligning the individual seeds before they can be accessed and opened. Ultimately, such simplification should enable increased processing speed and therefore increased throughput of processed seeds.

SUMMARY

The method according to the present invention comprises: creating an opening in the seed by accessing the seed through the access opening of the at least one seed support.

The system according to the present invention is characterized in that the access opening is a tangential groove, said tangential groove permitting access to the seed along a secant line cutting the circumference of the rotatable wheel.

The access opening is arranged and configured to permit access from a direction perpendicular or inclined with respect to axis of rotation of rotatable wheel. For example, it allows cutting the seed (e.g. drilling, milling, sawing, grinding or laser cutting) through the access opening. Cutting may be performed with a cutting tool having a geometrically defined or geometrically undefined cutting edge.

The seed support can be a seed retainer, container, receptacle, "bag" or generally a seed-carrying component. Input of the seeds into the rotatable wheel can be performed via a separate placement device as well as by using a through feed method of bulk goods (e.g. moving parts of the rotatable wheel through an accumulation of loose seeds contained in a bunker). Together with the fixed support structure restricting movement of the seed in a direction away from an axis of rotation of the rotatable wheel, thereby providing a reference for aligning the seed, accessing the seed through the access opening can ensure a constant penetration depth (e.g. cutting depth) when accessing the seed. The fixed support structures can be for example walls, bars or point supports. They are fixed with respect to the rotatable wheel. The wheel being rotatable means that it is configured to rotate or revolve in operation of the seed transport system, e.g. it can be pivot-mounted and connected to a turning drive.

The tangential groove forming the access opening of the present system is arranged perpendicular to the axis of rotation of the rotatable wheel. This allows for cutting the seed in a tangential and radial direction, e.g. using a sawing wheel arranged in the same plane and adjacent to the rotatable wheel. During operation, such a sawing wheel may preferably rotate in the same or opposite direction of rotation as the rotatable wheel. Optionally, the seed transportation system comprises one or more clearing blades extending into the tangential groove of the rotatable wheel in order to remove accumulated seed offcut or other pollution hindering access to the seed support.

When the access opening is a tangential groove, according to an improved variant of the present method, the rotatable wheel can rotate continuously during the receiving, rotating and creating steps. Continuous movement generally allows for easier or no synchronization and consequently faster processing of seeds. For example, the rotating wheel may be operated at a speed of 120 rounds per minute or higher.

In an advantageous embodiment, the fixed support structures comprise two support bars extending on a radially outer side of the seed support, one on each side of the tangential groove. Each of the two support bars may be part of a wall, the walls being separated by the tangential groove.

In a particularly preferred embodiment, the at least one seed support is a cavity with a loading opening for receiving a seed from an axial direction relative to the rotatable wheel. In this case, the rotatable wheel can be a disc-shaped body, wherein each cavity is formed by a depression in one of the flat sides of the body. For example, the disc-shaped body may be made of chromed steel. It may have a diameter of e.g. 500 mm. Movement of the seed in any other direction than through the loading opening is restricted by the side walls of the cavity. Consequently, the direction for introducing the seed into the seed support is perpendicular or at least inclined to the direction for accessing the seed when creating an opening in the seed. In a further improvement, the shape of the cavity is configured such as to favor a particular orientation of a seed within the cavity, thereby reducing the probability of misalignment of the seed within the seed support, which could otherwise lead to critical damage of the seed when creating the opening.

Moreover, the rotatable wheel may comprise a template next to the loading opening of each seed support. The template may have the shape of a paddle or bucket. Such a template helps to prevent accumulation of two or more seeds in one seed support.

It has turned out advantageous, that the rotatable wheel further comprises fastening means, in particular at least one movable pin, for fixing the position of the seed within the seed support. The fastening means can use mechanical restriction (e.g. clamping) or adhesion (e.g. suction) to fix the seed. Thereby movement of the seed within the seed support, e.g. caused by the rotation of the rotatable wheel or by contact with a cutting means, can be prevented.

If the fastening means, in particular the at least one moveable pin, is configured to force the seed in a direction away from an axis of rotation of the rotatable wheel, it not only fixes the seed within the seed support, but also aligns it with respect to a fixed support structure restricting movement of the seed in the direction away from an axis of rotation of the rotatable wheel. In other words, the seed can be pushed against one of the fixed support structures and thereby into a predictable position with respect to the access opening, in particular a position where the seed protrudes into the access opening. The fastening means enables the rotatable wheel to pick up and hold at least one seed within the at least one seed support, pre-position each seed with respect to an access opening and fix it in position.

In a preferred embodiment, the fastening means comprises at least one pin movable with respect to the one or more fixed support structures in order to clamp the seed. The at least one movable pin can be a slide or bolt, in particular a movable bolt pushing radially outward with respect to the rotatable wheel. The at least one movable pin may be operated hydraulically, electrically or—preferably—pneumatically.

Moreover, the seed transportation system may comprise ejection means for ejecting the seed from the at least one seed support. The ejection means are configured to remove one seed from one particular associated seed support. More in detail, the ejection means forcefully eject the seed from the seed support, i.e. forcing it away from and out of the seed support. One preferred ejection means is an air channel or pressure pipe opening out into the seed support and connected to a source of pressurized air via a valve controlling an ejection action.

It has turned out particularly advantageous, that the ejection means is configured to operate the fastening means, in particular the at least one moveable pin, to release the seed from the seed support. For example, the fastening means may comprise a piston movable by applying air pressure, wherein said piston is connected to a clamping means such that the clamping means is retracted from a seed when air pressure is applied to the piston.

In order to detect a misalignment of a seed received in the seed support, the seed transportation system may comprise an optical sensor configured to detect an orientation of the seed within the at least one seed support. The optical sensor may be a color sensor or a camera system. For example, a color sensor can be used, when the germ buds of the used seed type are generally lighter in color than the fruit skin, behind which the endosperm is located. The optical sensor is arranged outside the wheel on an optical line-of-sight from the seed support through the access opening in a detection position of the seed and seed support.

Correspondingly the present method may comprise the following steps after the receiving step and before the creating step (i.e. the step of creating an opening in the seed): detecting with the optical sensor an orientation of the seed; and ejecting the seed from the at least one seed support if an undesired orientation is detected, thereby eliminating the seed from the further process. By ejecting seeds having an undesired orientation, critical damage of seeds can be avoided and the ratio of undamaged prepared seeds increased.

In a preferred application of the present method, it comprises the following step after the creating step: introducing a predefined amount of additive into the seed through the created opening. Such an additive can support desired plant properties, such as growth, or provide protection or resistance against environmental impact, including pest. Introduction of the additive may be performed by spraying the additive from a nozzle arranged adjacent the access opening of a seed support holding an open seed. Tuning of the dosage of the additive can be effected by a pumping system equipped either with a vane type pump or with a diaphragm valve.

In addition, and in order to protect the processed seed, the present method preferably comprises the following step after the introducing step: sealing the seed with a sealant. The sealant closes the opening created in the seed and protects the seed and the introduced additive from damage during transport and storage. The sealant may be glue produced from collected seed offcut. It may be sprayed through the access opening in a similar manner as described above for the additive.

After processing, the seed can be ejected from the seed support by pressurized air, as described above for seeds having an undesired orientation, or by gravity. Subsequently the seed may be conveyed through a drying station (e.g. comprising a furnace) for drying the sealant.

BRIEF DESCRIPTION OF THE DRAWINGS

The invention will be defined in more detail below by means of preferred exemplary embodiments, to which it is not to be limited to, however, and with reference to the drawings. In detail.

DETAILED DESCRIPTION

Figure 1:
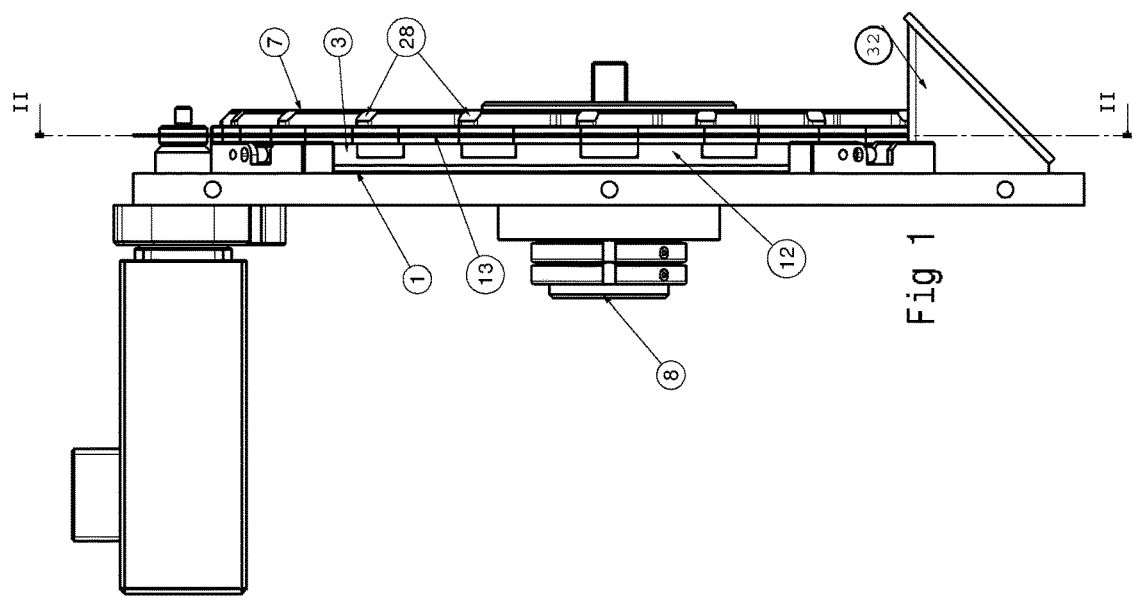
FIG. 1 a side view of a rotatable wheel according to the invention.
Figure 2:
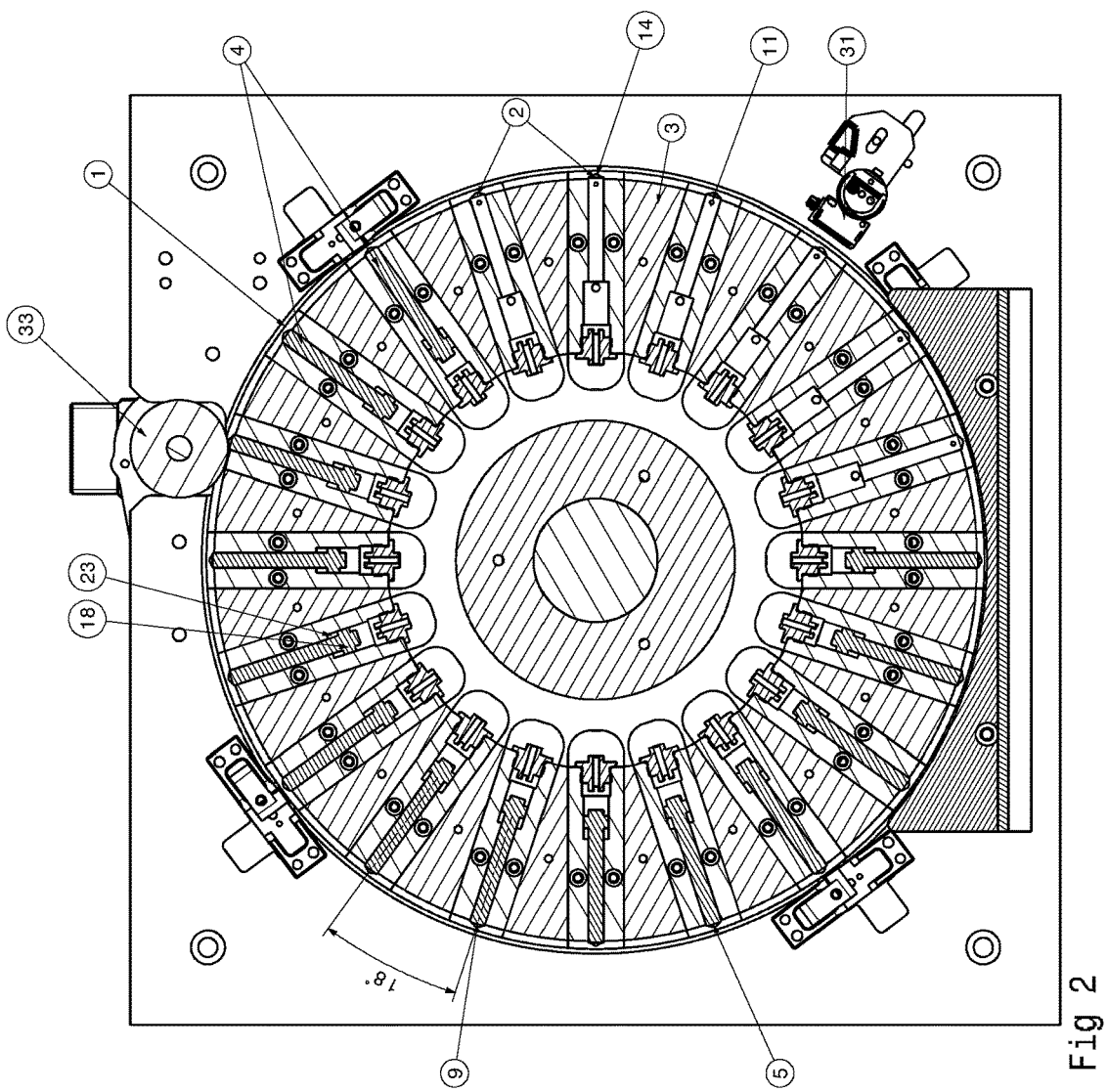
FIG. 2 a cut view of the rotatable wheel along the line II-II in FIG. 1.
Figure 4:
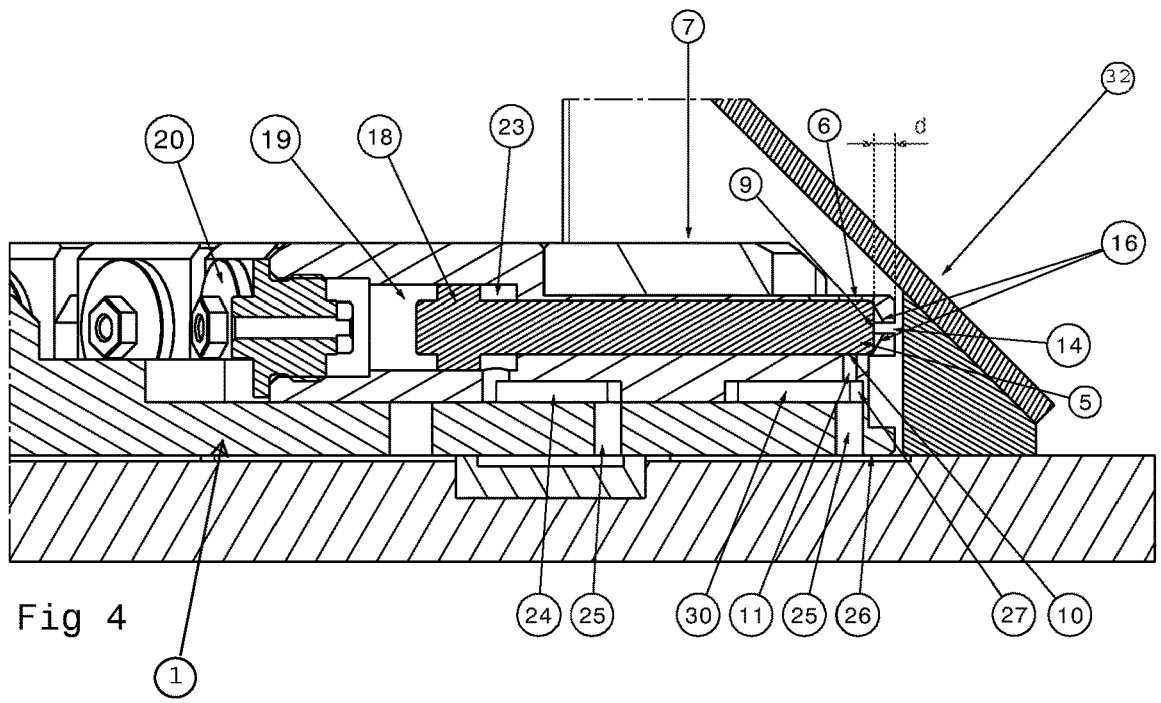
FIG. 4 a cut view of the part shown in FIG. 3 along the line IV-IV.
Figure 3:
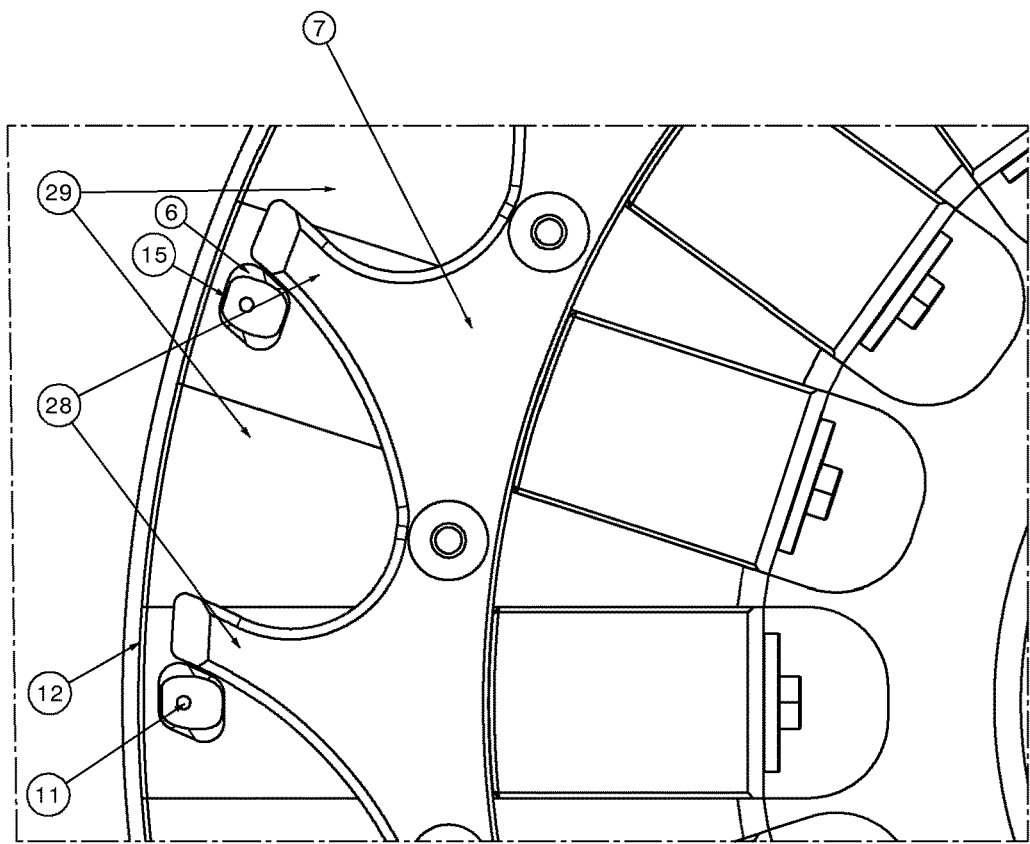
FIG. 3 a top plan view of a part of the rotatable wheel according to FIGS. 1 and 2.

The rotatable wheel 1 shown in FIGS. 1 to 4 has a plurality of seed supports 2 for holding individual seeds. The rotatable wheel 1 comprises a disc-shaped body 3, in which movable pins 4 are slidably arranged, one for each of the twenty seed supports 2. Each seed support 2 is formed by a cavity 5 within the disc-shaped body 3. Each cavity 5 has a loading opening 6, which is essentially parallel to a top side 7 of the rotatable wheel 1. The loading opening 6 allows for receiving a seed in the cavity 5 from an axial direction relative to the rotatable wheel 1. In a radial direction toward an axis of rotation 8 of the rotatable wheel 1, the seed support 2 is bounded by a radially outer end 9 of the respective movable pin 4. At its bottom side 10 opposite the loading opening 6, each cavity 5 is connected to an ejector drill hole 11. In both circumferential directions relative to the rotatable wheel 1 and in a direction away from the axis of rotation 8 of the rotatable wheel 1, each cavity 5 is bounded by side walls formed by the disc-shaped body 3 of the rotatable wheel 1.

On its radially outer side 12, the rotatable wheel 1 has a tangential groove 13. The tangential groove 13 extends around the entire circumference of the rotatable wheel 1. The depth d (see FIG. 4) of the tangential groove 13 is such that it produces an access opening 14 in the radially outer side of each seed support 2. The access openings 14 permit access to a seed received in the respective seed support 2 from outside the rotatable wheel 1. In detail, the access openings 14 permit a cutting means (for example a sawing wheel) to access, penetrate and thereby open seeds received in the seed supports 2. Due to the tangential groove 13, a radially outer wall 15 of each cavity 5 is effectively separated into two support bars 16 extending on a radially outer side of the seed support 2, one on each side of the tangential groove 13.

The movable pin 4 is connected to a piston part 18 and a pressure spring 19 (e.g. a helical spring) resting at one end on the piston part 18 and at the other end to a screw cover 20 fixed with respect to the rotatable wheel 1, thereby biasing the movable pin 4 into the associated cavity 5. The piston part 18 is arranged within a cylinder 23 formed inside the rotatable wheel 1 and connected at a position radially outside the piston part 18 to a pressure pipe 24 within the rotatable wheel 1. When pressurized air is supplied to the pressure pipe 24, the piston part 18 is forced in a direction toward the axis of rotation 8, thereby retracting the movable pin 4 from the cavity 5. Another pressure pipe 30 is connected to the ejector drill hole 11, such that part of the pressurized air is blown into the cavity 5 and therefore ejects a seed received therein through the loading opening 6, once the movable pin 4 is retracted from the cavity 5 to release the seed. Pressurized air can be supplied to the pressure pipes 24 and 30 from supply holes 25 in the bottom side 26 of the rotatable wheel 1. The supply of pressurized air to the pressure pipe 24 is controlled based on the output of an optical sensor 31, which detects the color of a seed surface exposed through the access opening 14. If, based on the detected color, the seed has an undesired orientation within the seed support 2, a control valve is opened to trigger ejection of that specific seed by supplying pressurized air to the associated pressure pipe 24 and 30. The combination of an optical color detector and pneumatic ejection means has the advantage, that relatively low detection, switching and reaction delays (fractions of a second) can be achieved, enabling higher rotation speed and throughput of the seed transportation system.

On its top side 7, the rotatable wheel 1 comprises templates 28 next to each of the loading openings 6. The templates 28 are paddle-shaped and define collection trays 29 between them on the top side 7, which improve the collection of individual seeds in each seed support 2.

A preferred application of the rotatable wheel 1 described above is in a seed transportation system that is part of an automatic seed preparation system 32. In such a system, the individual seeds received in each seed support 2 are conveyed to a cutting station 33 by rotating the rotatable wheel 1. At the cutting station 33 a cutting means creates an opening in the seeds by accessing each seed through the access opening 14 of the respective seed support 2. The cutting means can be a continuously rotating sawing wheel and the rotatable wheel 1 can also rotate continuously, thereby feeding the received seeds through the sawing wheel. Thereafter an injection station can be provided along the circumference of the rotatable wheel 1, where a predefined amount of additive is introduced into the passing seeds by spraying through the access openings 14. Further on along the circumference of the rotatable wheel 1, a sealing station can be provided, where a sealant is sprayed through the access openings 14 to close the openings created in the passing seeds, thereby protecting the seeds and the additive. Finally, all remaining seeds can get ejected into a collection pit by supplying pressurized air to the pressure pipe 24 and 30 of each passing seed support 2.

The invention claimed is:

1. A seed transportation system comprising: a rotatable wheel with at least one seed support for holding a seed; wherein said at least one seed support has one or more fixed support structures configured to restrict movement of the seed in a circumferential direction relative to the rotatable wheel and in a direction away from an axis of rotation of the rotatable wheel; wherein said at least one seed support has an access opening in a radially outer side, said access opening permitting access to the seed; said access opening is a groove in an outer circumference of the rotatable wheel in a plane orthogonal to said axis of rotation, said plane extending through said at least one seed support; said groove permitting access to the seed along a secant line cutting said outer circumference of the rotatable wheel, a groove axis extending along said groove and being transverse to said axis of rotation, said secant line being aligned with said groove axis.

2. A seed transportation system according to claim 1, characterized in that the fixed support structures comprise two support bars extending on a radially outer side of the at least one seed support, one on each side of the groove.

3. A seed transportation system according to claim 1, characterized in that the at least one seed support is a cavity with a loading opening for receiving a seed from an axial direction relative to the rotatable wheel.

4. A seed transportation system according to claim 1, characterized in that the rotatable wheel further comprises at least one movable pin for fixing the position of the seed within the at least one seed support.

5. A seed transportation system according to claim 4, characterized in that the at least one movable pin is configured to force the seed in a direction away from an axis of rotation of the rotatable wheel.

6. A seed transportation system according to claim 1, characterized in that it comprises ejection means for ejecting the seed from the at least one seed support.

7. A seed transportation system according to claim 6, characterized in that the ejection means is configured to operate at least one movable pin to release the seed from the at least one seed support.

8. A seed transportation system according to claim 1, characterized in that it comprises an optical sensor configured to detect an orientation of the seed within the at least one seed support.

9. A method for transporting at least one seed with a seed transportation system comprising a rotatable wheel with at least one seed support for holding a seed, wherein said at least one seed support has one or more fixed support structures configured to restrict movement of the seed in a circumferential direction relative to the rotatable wheel and in a direction away from an axis of rotation of the rotatable wheel, wherein said at least one seed support has an access opening in its radially outer side, said access opening is a groove in an outer circumference of the rotatable wheel in a plane orthogonal to said axis of rotation, said plane extending through said at least one seed support, said groove permitting access to the seed along a secant line cutting said outer circumference of the rotatable wheel, a groove axis extending along said groove and being transverse to said axis of rotation, said secant line being aligned with said groove axis, the method comprising the following steps:

receiving a seed in the at least one seed support;

rotating the rotatable wheel, thereby conveying the seed; and creating an opening in the seed by accessing the seed through the access opening of the at least one seed support.

10. The method according to claim 9, characterized in that the rotatable wheel rotates continuously during the receiving, rotating and creating steps.

11. The method according to claim 9, characterized in that the seed transportation system comprises an optical sensor, wherein the method comprises the following steps after the receiving step and before the creating step:

detecting with the optical sensor an orientation of the seed; and ejecting the seed from the at least one seed support if an undesired orientation is detected.

12. The method according to claim 9, characterized in that the method comprises the following step after the creating step:

introducing a predefined amount of additive into the seed through the created opening.

13. The method according to claim 12, characterized in that the method comprises the following step after the introducing step:

sealing the seed with a sealant.

* * * * *

UNITED STATES PATENT AND TRADEMARK OFFICE
CERTIFICATE OF CORRECTION

| | | |
|---|---|---|
| PATENT NO. | : 11,910,738 B2 | Page 1 of 1 |
| APPLICATION NO. | : 16/649587 | |
| DATED | : February 27, 2024 | |
| INVENTOR(S) | : Wolfgang Rosenbaum et al. | |

It is certified that error appears in the above-identified patent and that said Letters Patent is hereby corrected as shown below:

On the Title Page

(72) Inventors should read:  Wolfgang ROSENBAUM, Rohrbach a.d. Gölsen (AT)
Markus LEOPOLD, Rohrbach (AT)
Nikolaus PFAFFENBICHLER, Vienna (AT)
Birgit MITTER, Hinterbruhl (AT)

Signed and Sealed this
Twenty-second Day of October, 2024

Katherine Kelly Vidal
*Director of the United States Patent and Trademark Office*